Jan. 1, 1963 C. H. LUDWIG Re. 25,314

BLADE SHARPENING APPARATUS

Original Filed April 17, 1957 4 Sheets-Sheet 1

INVENTOR.
CLARENCE H. LUDWIG

BY George A. Gust
ATTORNEY

Jan. 1, 1963 C. H. LUDWIG Re. 25,314

BLADE SHARPENING APPARATUS

Original Filed April 17, 1957 4 Sheets-Sheet 2

INVENTOR.
CLARENCE H. LUDWIG

BY George A. Just
ATTORNEY

BLADE SHARPENING APPARATUS

Original Filed April 17, 1957 4 Sheets-Sheet 3

INVENTOR.
CLARENCE H. LUDWIG

BY George A. Gust
ATTORNEY

BLADE SHARPENING APPARATUS

Original Filed April 17, 1957 4 Sheets-Sheet 4

INVENTOR.
CLARENCE H. LUDWIG

BY

George A. Gust
ATTORNEY

United States Patent Office

Re. 25,314
Reissued Jan. 1, 1963

25,314
BLADE SHARPENING APPARATUS

Clarence H. Ludwig, 914 W. Washington St., Bluffton, Ind.

Original No. 2,972,840, dated Feb. 28, 1961, Ser. No. 653,404, Apr. 17, 1957. Application for reissue Apr. 16, 1962, Ser. No. 189,664
20 Claims. (Cl. 51—248)

Matter enclosed in heavy brackets [ ] appears in the original patent but forms no part of this reissue specification; matter printed in italics indicates the additions made by reissue.

This invention relates to apparatus for sharpening the cutting edge of an elongated blade, and more particularly to blade sharpening apparatus which provides spot contact of the grinding elements with the cutting edge of the blade and which is actuated by longitudinal movement of the blade.

Endless, band-type blades, generally of the scalloped type, are commonly employed in bread slicing machines; since the bread is sliced while it is still warm, it is necessary that these blades be maintained in an exceedingly sharp condition. In the past, such blades have been sharpened by means of a dish-shaped grinding wheel, the radial surface of the outer periphery of the wheel engaging the cutting edge of the blade. That method of blade sharpening involved engagement of an area of the cutting edge with the grinding wheel, resulting in a tendency to deflect the cutting edge instead of grinding it.

It is therefore desirable to provide a blade sharpening apparatus in which spot contact of the grinding element with the cutting edge is provided, thereby to eliminate the deflection encountered in previous apparatus in which there was area contact of the grinding element and the cutting edge. It is further desirable that such apparatus provide a honing action and be actuated by movement of the blade so that no auxiliary power is required. It is also desirable that such apparatus be simple and readily engageable and disengageable with the blade to permit it to be readily shifted from one blade to another blade of the slicing machine.

It is therefore an object of this invention to provide improved sharpening apparatus for an elongated blade.

Another object of this invention is to provide improved sharpening apparatus for an elongated blade which provides spot contact of the cutting edge of the blade with the grinding element.

A further object of this invention is to provide improved sharpening apparatus for an elongated blade which provides a honing action.

Yet another object of this invention is to provide improved sharpening apparatus for an elongated blade which is actuated merely by longitudinal movement of the blade.

A still further object of this invention is to provide improved sharpening apparatus for an elongated blade incorporating the desirable features set forth above.

Further objects and advantages of this invention will become apparent by reference to the following description and the accompanying drawings, and the features of novelty which characterize this invention will be pointed out with particularity in the claims annexed to and forming a part of this specification.

I have discovered that spot contact of the grinding element and the blade can be achieved by forming the grinding element in the shape of a spherical ball, the grinding action being provided by the ball rotating upon an axis inclined at an angle with respect to the direction of movement of the blade. This invention in its broader aspects therefore provides apparatus for sharpening an elongated blade in which a ball formed of abrasive material is provided, the ball being supported for rotation about an axis inclined in an angle with respect to the direction of movement of the blade and held in engagement with the cutting edge thereof so that longitudinal movement of the blade causes the ball to rotate about the inclined axis thereby to grind the cutting edge. A pair of balls may be so disposed on opposite sides of the blade thereby to provide a honing action and in the case of a scalloped blade, the balls are preferably longitudinally spaced apart in the direction of the blade a distance equal to the pitch of the teeth of the blade. In the preferred embodiment of this invention, means are provided for manually adjusting the pressure applied by the balls to the cutting edge of the blade and means are also provided for manually releasing the engagement of the balls with the blade.

Figure 2:
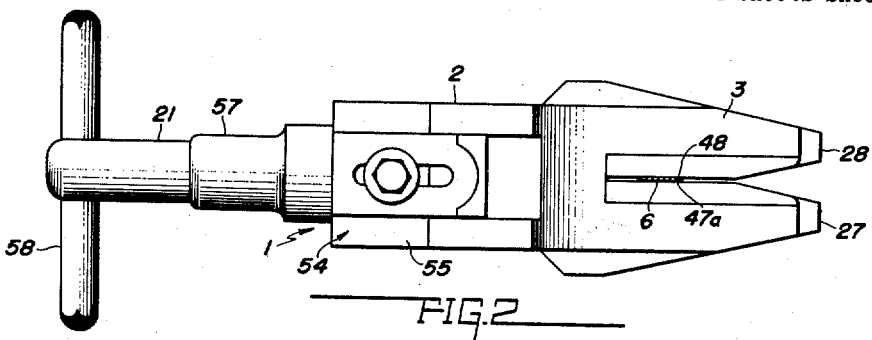
FIG. 2 is a view of the right-hand end of the apparatus of FIG. 1.
Figure 1:
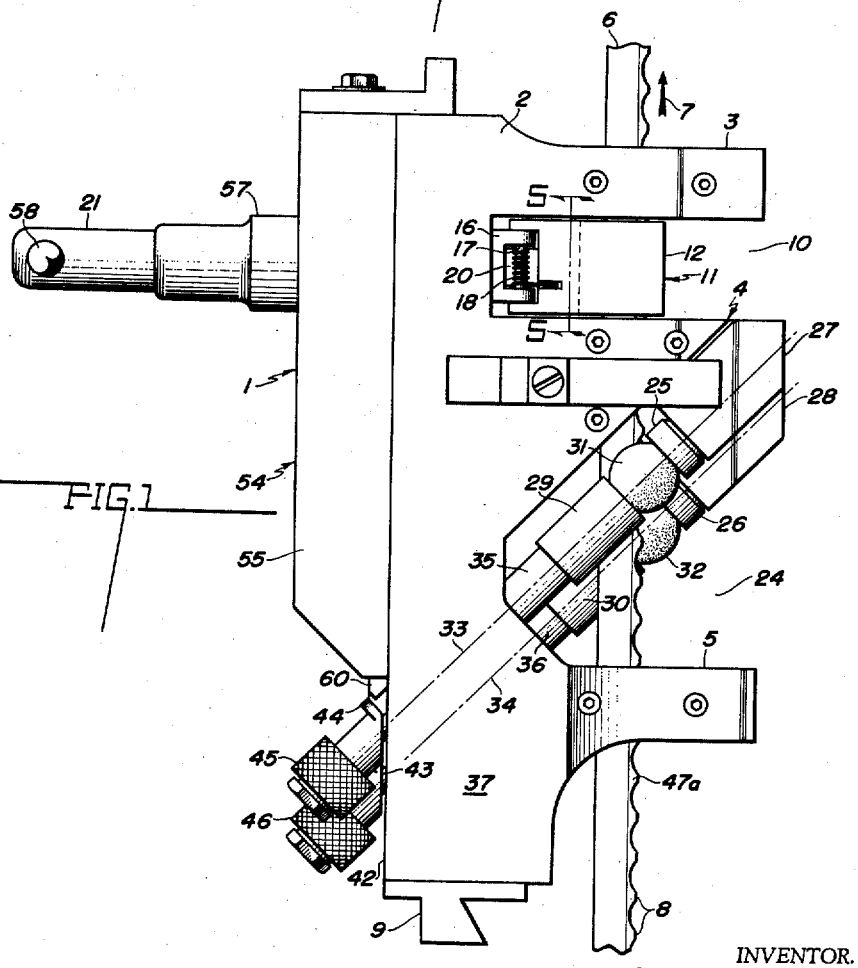
FIG. 1 is a side elevational view of the improved blade sharpening apparatus of my invention.
Figure 14:
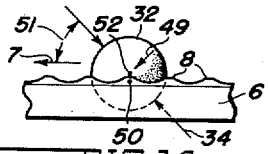
Figure 15:
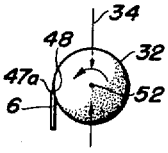

FIGS. 14 and 15 schematically illustrate the grinding action achieved by the apparatus of FIG. 1.

Referring now to FIGS. 1 through 5 of the drawings, my improved knife sharpening apparatus, generally identified as 1, includes a supporting frame 2 having blade guiding jaw portions 3, 4 and 5 adapted to receive elongated blade 6 therebetween and to guide it for longitudinal movement in the direction of the arrow 7. Blade 6 is shown as being of the scalloped type having spaced-apart teeth 8 and is actually a segment of an endless band-type blade such as is used in bread slicing apparatus. The frame 2 has a suitable mounting portion 9 adapted to support the apparatus 1 on a bread slicing machine (not shown).

Disposed in recess 10 between blade-guiding portions 3 and 4 is a blade wiping assembly 11 for wiping abrasive and steel dust from the blade resulting from the grinding operation. Blade wiping assembly 11 comprises a pair of arms 12 and 13 which straddle blade 6 and respectively have felt pads 14 and 15 secured to their inner surfaces. Felt pads 14 and 15 engage the opposite surfaces of blade 6, thereby wiping dust therefrom as the blade moves in the direction of the arrow 7. Arms 12 and 13 are respectively pivoted to supporting member 16 by means of pivot pins 17, coil springs 18 surrounding pins 17 and serving normally to bias arms 12 and 13 so that the felt pads 14 and 15 engage the opposite sides of blade 6. Supporting member 16 is mounted on frame 2 at the base of recess 10 and has an opening 19 formed therein through which extends an extension portion 20 of ball releasing shaft 21. The shaft extension 20 has a pair of flats 22 formed on its opposite sides adjacent its end. When shaft 21 and extension 20 are in the position shown in FIG. 5, flats 22 are respectively engaged by portions 23 of the inner surfaces of arms 12 and 13, so that springs 18 resiliently urge arms 12 and 13 together, thereby causing felt pads 14 and 15 to engage the blade 6. When shaft 21 and shaft extension 20 are rotated ninety degrees (90°), as will be hereinafter more fully described, to release the blade 6 from grinding engagement with the grinding elements, it will be seen that portions 23 on arms 12 and 13 are biased outwardly against the springs 18, thus causing felt pads 14 and 15 to be separated from blade 6, thereby to permit removal of blade 6 from the sharpening apparatus.

Figure 3:
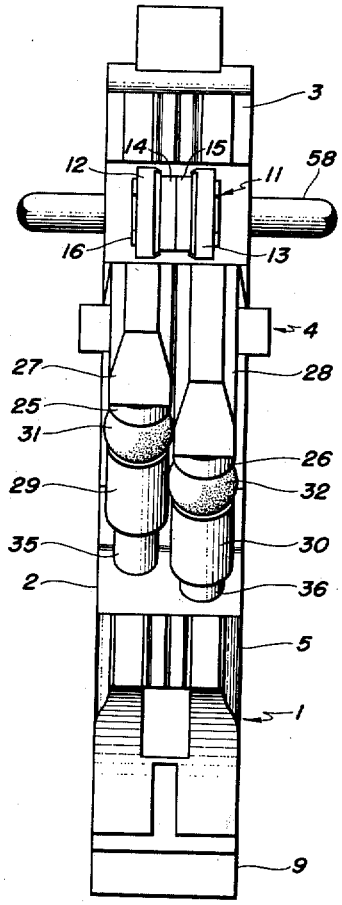
FIG. 3 is a bottom view of the apparatus of FIG. 1.
Figure 4:
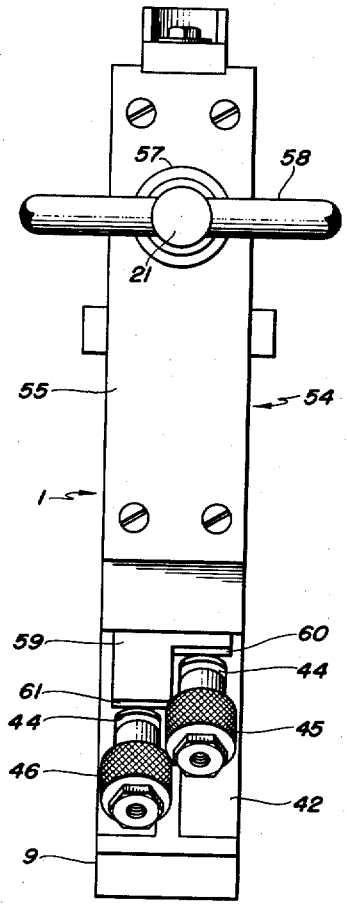
FIG. 4 is a top view of the apparatus of FIG. 1.
Figure 6:
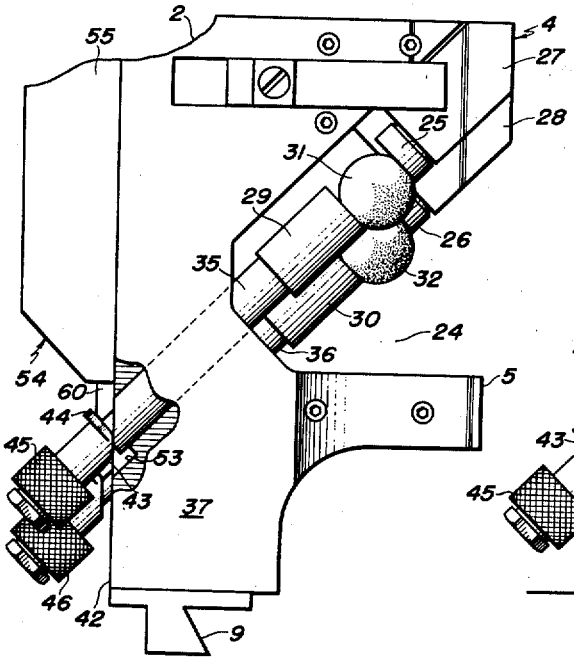
FIG. 6 is a fragmentary side view, partly in section, illustrating the apparatus of FIG. 1 with the grinding balls partly relaxed and one thumb-knob partly rotated.

The blade grinding elements themselves are positioned in recess 24 between blade guiding portions 4 and 5. Referring now to FIGS. 6 through 10, in addition to FIGS. 1 through 5, a pair of cup-shaped members 25 and 26 are provided respectively *rotatably* [rigidly] mounted *but retained* against axial movement on jaws 27 and 28 of blade guiding portion 4. Another pair of cup-shaped members 29 and 30 are provided straddling blade 6 and respectively spaced from cup-shaped members 25 and 26. A pair of spherical balls 31 and 32 respectively formed of suitable abrasive material, respectively have their diametrically opposite surfaces in tight engagement with the cup-shaped members 25, 29 and 26, 30 as shown in FIGS. 1 and 3, or alternatively rotatably seated in the cup-shaped members 25 and 29 and 26 and 30, as shown in FIGS. 6 and 8.

It will be seen that the two pairs of cooperating cup-shaped members 25 and 29 and 26 and 30 are respectively disposed on axes 33 and 34 which are respectively inclined at acute angles with respect to the direction of movement 7 of blade 6, and that balls 31 and 32 will therefore rotate about these axes.

In order to support cup-shaped members 29 and 30, a pair of hollow tubular members 35 and 36 are respectively provided [secured] in suitable openings extending through portion 37 of frame 2. Cup-shaped members 29 and 30 are respectively *rotatably* secured *but retained* against axial movement *with respect* to ends 38 of supporting members 39 which extend through tubular members 35. The ends 40 of tubular members 35 remote from cup-[shraped]*shaped* members 29 and 30 are respectively bevelled, as at 41, to conform to the [upper] surface 42 of frame 2. Axial cam surfaces 43 are respectively formed on the ends of supporting members 39 remote from the ends 38 to which cup members 29 and 30 are secured with radially extending projections 44 respectively formed thereon. Thumb-knobs 45 and 46 are respectively formed integral with the cam surfaces 43 on the ends of the supporting members 39. Coil springs 46a are respectively positioned around the central portions of supporting members 39 within tubular members 35 and abut shoulders 47 on ends 38 of the supporting members 39 and rear walls 48 of tubular members 35. It will now be seen that the springs 46a resiliently urge the supporting members 39 and the cup-shaped members 29 and 30 in the direction of the balls 31 and 32.

With the cam surfaces 43 formed integrally with the knobs 45 and 46 arranged in the position shown in FIG. 1, it will be seen that the springs 46a respectively urge the cup-shaped members 29 and 30 into tight engagement with the balls 31 and 32. In this first or normal position of the supporting members 39 and cup-shaped members 29 and 30, balls 31 and 32 respectively engage the cutting edges 47a and 48 of blade 6. Referring now specifically to FIGS. 14 and 15, it will be seen that with the axis 34 of ball 32 inclined at an acute angle with respect to the direction of movement 7 of blade 6 and with ball 32 in engagement with cutting edge 48 of blade 6, movement of blade 6 in the direction of the arrow 7 will cause ball 32 to rotate about the axis 34 inwardly toward the blade in the direction of the arrow 49. It will further be seen that the ball 32 (and likewise the ball 31 which is not shown in FIGS. 14 and 15) has spot engagement with the cutting edge of the blade 6 as at 50. I have found that the angle 51 between axis 34 in the direction of movement 7 is preferably on the order of forty-five degrees (45°) in order to secure the optimum grinding action. I have further found that the angle 51 should be acute in order to cause the balls 31 and 32 to turn inwardly toward the cutting edge of the blade, since with an acute angle of inclination, as shown, the inward rotation of the balls cuts a finer edge than if the balls are rotated outwardly away from the edge as is the case when the angle 51 is obtuse with respect to the direction of movement 7 of the blade 6. With the angle 51 between axis 34 and direction of movement 7 being acute, as indicated, the blade 6 is further prevented from climbing out of the apparatus as is the case if the angle is obtuse since the engagement of the balls 31 and 32 with the opposite cutting edges 47 and 48 of blade 6 and their inward rotation toward the blade urges the blade into rather than out of the jaws of the guiding portions 3, 4 and 5. I have further found that the spot contact 50 of the ball 32 and a tooth 8 as shown in FIGS. 14 and 15 should be below the center 52 of the ball for optimum grinding action.

Figure 7:
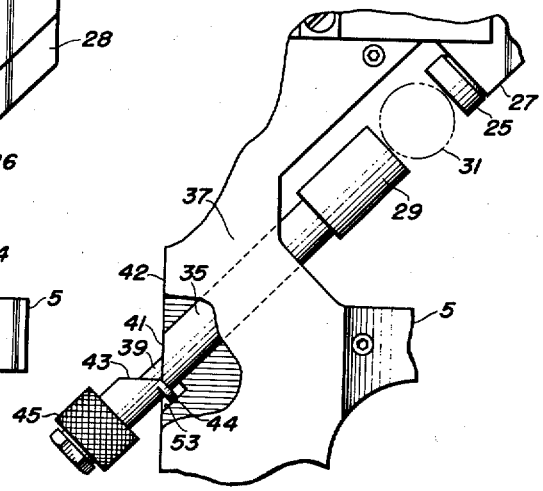
FIG. 7 is another fragmentary side view, partly in section, illustrating the apparatus of FIG. 1 in a position for changing the grinding balls.
Figure 10:
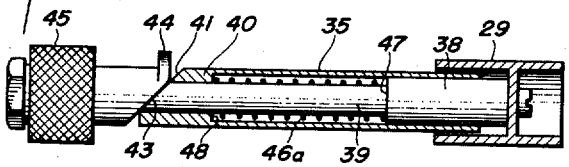
FIG. 10 is a fragmentary view, partly in section, of the ball supporting assembly of the apparatus of FIG. 1.
Figure 5:
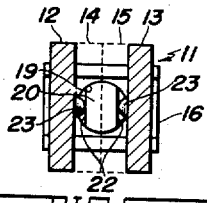
FIG. 5 is a fragmentary cross-sectional view taken along the line 5—5 of FIG. 1.
Figure 8:
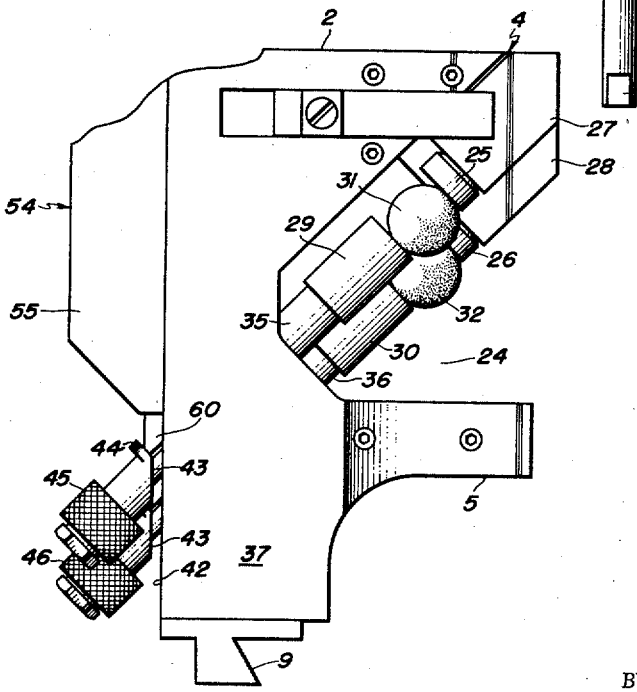
FIG. 8 is a fragmentary side view of the apparatus of FIG. 1 showing the manner of releasing the grinding balls from engagement with the blade being sharpened.
Figure 9:
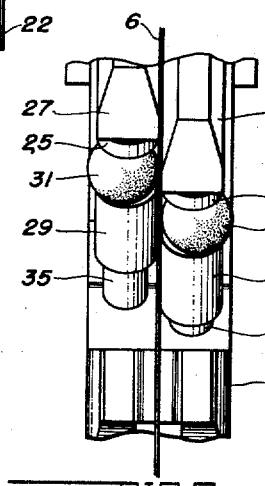
FIG. 9 is a fragmentary bottom view of the apparatus in the position of FIG. 8.

Reference to FIGS. 6 and 7 will now indicate that as the thumb-knobs 45 and 46 are rotated, the cam surfaces 43 cooperate with the upper surface 42 of frame 2, thereby biasing the supporting members 39 and the cup-shaped members 29 and 30 against springs 46a in a direction away from balls 31 and 32 thereby to relax the balls in their respective cup-shaped members 25 and 29, and 26 and 30, respectively. Rotation of the thumb-knobs 45 and 46 one hundred eighty degrees (180°) from their position shown in FIG. 1, as shown in FIG. 7, causes the cup-shaped members 29 and 30 to be moved axially away from the cup-shaped members 25 and 26, respectively, along the axes 33 and 34 to permit complete removal of the balls 31 and 32. It will be seen in FIG. 7 that a suitable recess 53 is provided in upper surface 42 of frame 2 to accommodate the projecting portions 44 of cam surfaces 43. It will now be readily seen that the cup-shaped members 29 and 30 are movable between first normal positions in which the balls 31 and 32 are respectively tightly engaged and in turn tightly engage the opposite cutting surfaces 47 and 48 of blade 6, as shown in FIG. 1, and a second position as shown in FIG. 7 in which the balls are completely released from their respective cup-shaped members and may be removed. During honing, the blade is taut under tension. Thus, moving the hone (with the balls clamped in place) rearwardly (see FIG. 1) serves to increase the pressure with which the balls engage the blade, whereas moving it forwardly reduces the pressure. Thus, the position of the hone should be adjusted to achieve a desired grinding pressure.

In addition to the retention feature provided by the thumb-knobs 45 and 46, it is desirable to provide means for quickly disengaging balls 31 and 32 from the blade 6 to permit the knife sharpening apparatus 1 to be removed from a given blade 6 and transferred to another blade. In order to accomplish this action, a blade-disengaging assembly 54 is provided mounted on the upper surface 42 of frame 2. Blade-disengaging assembly 54 includes a housing member 55 having a suitable opening 56 formed therein and a bearing hub portion 57 formed thereon for accommodating shaft 21 having an actuating handle 58 formed at its upper end remote from its extension 20. A member 59 is slidably mounted within housing portion 55 and has axially staggered beveled portions 60 and 61 respectively formed at one end thereof.

Figure 11:
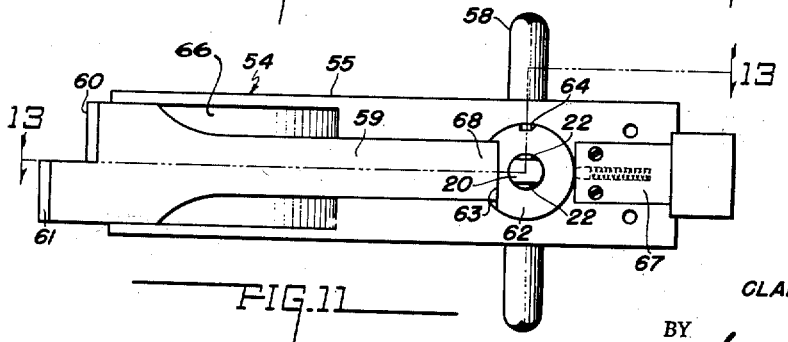
FIG. 11 is a bottom view of the grinding ball releasing assembly of the apparatus of FIG. 1 with the releasing handle in the position for grinding.

Shaft 21 has a cam 62 secured thereto having a flat portion 63 and a detent recess 64 formed therein. Slidable member 59 is held in engagement with the cam 62 by means of a suitable coil spring 65 positioned within recess 66 formed in housing member 55 and a suitable spring actuated detent assembly 67 is arranged to engage detent groove 64 in cam 62 in the position of handle 58 shown in FIG. 12. It is seen that in the position of FIG. 12, slidable member 59 is biased outwardly whereas in the position of FIG. 11 with handle 58 in the position shown the end 68 of slidable member 59 is in engagement with flat 63 of cam 62 and thus slidable member 59 is biased inwardly by the influence of spring 65.

Figure 12:
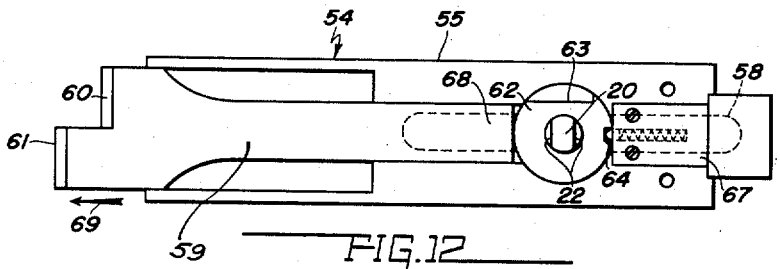
FIG. 12 is a view similar to FIG. 11 with the releasing handle in the position for releasing the grinding balls from engagement with the blade.
Figure 13:
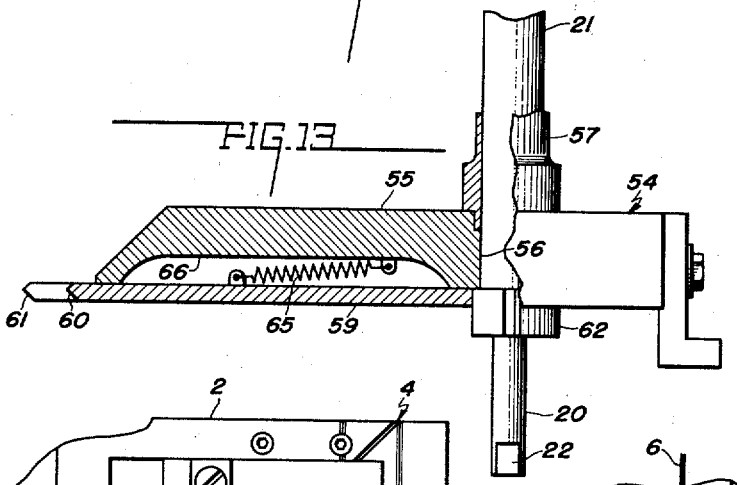
FIG. 13 is a view taken along the line 13—13 of FIG. 11.

Balls 31 and 32 are preferably spaced apart in the direction of movement of blade 6, a distance equal to the distance between adjacent points 8 of blade 6, i.e., the pitch of the points, and thus the thumb-knobs 45 and 46, the cam surfaces 43 and the projecting portions 44 will be correspondingly spaced apart along the [upper] surface 42 of frame 2. It will be observed that the longitudinal distance between the beveled ends 60 and 61 of slidable member 59 of blade-disengaging assembly 54 equals the longitudinal spacing of balls 31 and 32 and that in the position of handle 58 shown in FIGS. 1, 2 and 11 the beveled ends 60 and 61 are arranged respectively adjacent but not engaging projecting portions 44 of cam surfaces 43. With the handle 58 rotated ninety degrees (90°) as shown in FIGS. 8 and 12, slidable member 59 is moved axially in the direction of arrow 69, FIG. 12, responsive to rotation of cam 62 so that bevelled edges 60 and 61 respectively engage projecting portions 44 on cam surfaces 43, as shown in FIG. 8, thereby moving cup-shaped members 29 and 30 toward their second positions to relax the balls 31 and 32 so that they no longer tightly engage the blade 6 so that blade 6 may be removed from the sharpening apparatus 1 or the sharpening apparatus 1 removed from the blade and positioned on another blade to be sharpened.

I have further found that each time the cup-shaped members 29 and 30 are moved from their normal position tightly engaging balls 31 and 32 toward their second positions to relax the balls, and the apparatus is removed from the blade and re-installed on another blade, this movement of the blade with respect to the balls at right angles to its normal movement shifts the balls to new positions with respect to the cup-shaped members so that over a period of time the entire surface of the balls is used for honing thereby maintaining the roundness of the balls and obtaining maximum ball life. I have further found that greater grinding pressure is achieved by the spot contact provided by my improved grinding apparatus than was achieved by the area contact provided by prior grinding wheels, this greater grinding pressure resulting in better and more efficient grinding action by the grinding balls. This apparatus is usable with either straight blades or scalloped blades of both the two and four-bevelled variety. In an apparatus actually constructed in accordance with this invention, I have used abrasive balls three-fourths (¾) inch in diameter spaced one-half (½) inch apart for grinding a blade having a pitch of one-half (½) inch point-to-point.

It will now be readily apparent that my improved blade sharpening apparatus provides spot contact between the cutting edge of the blade and the grinding element rather than the area contact previously provided. It will be further readily apparent that I provide a honing action with both cutting edges being simultaneously ground and that the apparatus is self-actuated, i.e., the grinding action is provided by movement of the blade with no auxiliary power being required.

While I have illustrated and described a specific embodiment of this invention, further modifications and improvements will occur to those skilled in the art. I desire that it be understood therefore that this invention is not limited to the particular form shown and I intend in the appended claims to cover all modifications which do not depart from the spirit and scope of this invention.

What is claimed is:

1. Apparatus for sharpening and honing the cutting edge of an elongated scalloped blade comprising: a pair of spherical balls formed of abrasive material; support means for receiving said blade for movement in a longitudinal direction; and a pair of means on said support means respectively releasably clamping and rotatably mounting said balls for rotation about axes inclined at angles with respect to said direction of movement of said blade, said mounting means being spaced apart in the direction of said movement respectively an amount equal to the pitch of the teeth of said blade and being adapted respectively to hold said balls in engagement with opposite sides of said cutting edge so that said longitudinal movement of said blade causes said balls to rotate about said axis thereby sharpening and honing said cutting edge.

2. Apparatus for sharpening the cutting edge of an elongated blade comprising: at least one spherical ball formed of abrasive material; support means for receiving said blade for movement in a longitudinal direction; and members on said support means releasably clamping and rotatably mounting said ball for rotation about an axis inclined at a substantially forty-five degree (45°) angle with respect to said direction of movement of said blade, said members including means for holding said ball in engagement with a side of said cutting edge of said blade so that said longitudinal movement of said blade causes said ball to rotate about said axis inwardly toward said cutting edge thereby sharpening the same.

3. Apparatus for sharpening the cutting edge of an elongated blade comprising: at least one spherical ball formed of abrasive material; support means adapted to guide said blade for movement in a longitudinal direction; and a pair of spaced-apart cup-shaped members respectively mounted on said support means and disposed on an axis inclined at an angle with respect to said direction of movement; said ball having diametrically opposite surfaces respectively seated in said cup-shaped members for rotation about said axis, said cup-shaped members being adapted to hold said ball in engagement with a side of said cutting edge of said blade so that said longitudinal movement of said blade causes said ball to rotate about said axis thereby sharpening said cutting edge.

4. Apparatus for sharpening the cutting edge of an elongated blade comprising: at least one spherical ball formed of abrasive material; a supporting frame having portions adapted to receive and guide said blade for movement in a longitudinal direction; a first cup-shaped member [fixedly] mounted on a part of said frame; a second cup-shaped member spaced from said first cup-shaped member, said cup-shaped members being disposed on an axis inclined at an angle with respect to said direction of movement; said ball having diametrically opposite surfaces normally respectively seated in said cup-shaped members for rotation about said axis; and a supporting member for said second cup-shaped member mounted on another part of said frame, said supporting member having a normal position with said cup-shaped members tightly engaging said ball and adapted to hold the same in engagement with one side of said cutting edge of said blade so that said longitudinal movement of said blade causes said ball to rotate about said axis thereby sharpening said cutting edge, said supporting member having a second position with said cup-shaped members loosely engaging said ball thereby disengaging said ball from said cutting edge.

5. Apparatus for sharpening the cutting edge of an elongated blade comprising: at least one spherical ball formed of abrasive material; a supporting frame having portions adapted to receive and guide said blade for movement in a longitudinal direction; a first cup-shaped member mounted on a part of said frame; a second cup-shaped member spaced from said first cup-shaped member, said cup-shaped members being disposed on an axis inclined at an angle with respect to said direction of movement; said ball having diametrically opposite surfaces normally respectively seated in said cup-shaped members for rotation about said axis; a supporting member having said second cup-shaped member secured at one end thereof and mounted on another part of said frame for movement between a first normal position and a second position along said axis; and resilient means urging said second cup-shaped member toward engagement with said ball; said resilient means urging said second cup-shaped member against said ball in said normal position of said supporting member so that said cup-shaped members tightly engage said ball and hold the same in engagement with one side of said cutting edge of said blade whereby said longitudinal movement of said blade causes said ball to rotate about said axis thereby sharpening said cutting edge, said supporting member in said second position biasing said second cup-shaped member against said resilient means away from said ball so that said cup-shaped members loosely engage said ball thereby disengaging said ball from said cutting edge.

6. Apparatus for sharpening the cutting edge of an elongated blade comprising: at least one spherical ball formed of abrasive material; a supporting frame having portions adapted to receive and guide said blade for movement in a longitudinal direction; a first cup-shaped member mounted on a part of said frame; a second cup-shaped member spaced from said first cup-shaped member, said cup-shaped members being disposed on an axis inclined at an angle with respect to said direction of movement; said ball having diametrically opposite surfaces normally respectively seated in said cup-shaped members for rotation about said axis; a supporting member having said second cup-shaped member secured at one end thereof and mounted on another part of said frame for movement between a first normal position and a second position along said axis; resilient means urging said second cup-shaped member against said ball in said normal position of said supporting member so that said cup-shaped members tightly engage said ball and hold the same in engagement with one side of said cutting edge of said blade whereby said longitudinal movement of said blade causes said ball to rotate about said axis thereby sharpening said cutting edge, said supporting member in said second position biasing said second cup-shaped member against said resilient means away from said ball so that said cup-shaped members loosely engage said ball thereby disengaging said ball from said cutting edge, and manually actuated means for moving said supporting member from said normal position to said second position thereof.

7. Apparatus for sharpening the cutting edge of an elongated blade comprising: at least one spherical ball formed of abrasive material; a supporting frame having portions adapted to receive and guide said blade for movement in a longitudinal direction; a first cup-shaped member mounted on a part of said frame; a second cup-shaped member spaced from said first cup-shaped member, said cup-shaped members being disposed on an axis inclined at an angle with respect to said direction of movement; said ball having diametrically opposite surfaces normally respectively seated in said cup-shaped members for rotation about said axis; a supporting member having said second cup-shaped member secured at one end thereof and mounted on another part of said frame for movement between a first normal position and a second position along said axis; resilient means urging said second cup-shaped member against said ball in said normal position of said supporting member so that said cup-shaped members tightly engage said ball and hold the same in engagement with one side of said cutting edge of said blade whereby said longitudinal movement of said blade causes said ball to rotate about said axis thereby sharpening said cutting edge, said supporting member in said second position biasing said second cup-shaped member against said resilient means away from said ball so that said cup-shaped members loosely engage said ball thereby disengaging said ball from said cutting edge, and manually actuated cam means on said supporting member and cooperating with said frame for moving said supporting member from said normal position to said second position thereof.

8. Apparatus for sharpening the cutting edge of an elongated blade comprising: at least one spherical ball formed of abrasive material; a supporting frame having portions adapted to receive and guide said blade for movement in a longitudinal direction; a first cup-shaped member mounted on a part of said frame; a second cup-shaped member spaced from said first cup-shaped member, said cup-shaped members being disposed on an axis inclined at an angle with respect to said direction of movement; said ball having diametrically opposite surfaces normally respectively seated in said cup-shaped members for rotation about said axis; a supporting member having said second cup-shaped member secured at one end thereof and mounted on another part of said frame for movement between a first normal position and a second position along said axis; resilient means urging said second cup-shaped member toward engagement with said ball; said resilient means urging said second cup-shaped member against said ball in said normal position of said supporting member so that said cup-shaped members tightly engage said ball and hold the same in engagement with one side of said cutting edge of said blade whereby said longitudinal movement of said blade causes said ball to rotate about said axis thereby sharpening said cutting edge, said supporting member in said second position biasing said second cup-shaped member against said resilient means away from said ball so that said cup-shaped members loosely engage said ball thereby disengaging said ball from said cutting edge, first manually actuated cam means on said supporting member and cooperating with said frame for selectively moving said supporting member between said normal position and said second position thereby to adjust the pressure applied by said ball on said cutting edge; and second manually actuated means on said frame and cooperating with said first cam means for moving said supporting member from said normal position to said second position thereof thereby to permit disengagement of said blade from said ball.

9. Apparatus for sharpening the cutting edge of an elongated blade comprising: at least one spherical ball formed of abrasive material; a supporting frame having portions adapted to receive and guide said blade for movement in a longitudinal direction; a first cup-shaped member mounted on a part of said frame; a second cup-shaped member spaced from said first cup-shaped member, said cup-shaped members being disposed on an axis inclined at an angle with respect to said direction of movement; said ball having diametrically opposite surfaces normally respectively seated in said cup-shaped members for rotation about said axis; a hollow member mounted on another part of said frame along said axis; a supporting member having said second cup-shaped member secured at one end thereof and extending through said hollow member for axial movement along said axis between a first normal position and a second position; spring means within said hollow member and urging said supporting member and said second cup-shaped member toward said ball; said spring means urging said second cup-shaped member against said ball in said normal position of said supporting member so that said first and second cup-shaped members tightly engage said ball and hold the same in engagement with one side of said cutting edge of said blade [thereby]

*whereby* said longitudinal movement of said blade causes said ball to rotate about said axis thereby sharpening said cutting edge, said supporting member in said second position biasing said cup-shaped member against said spring means away from said ball so that said cup-shaped members loosely engage said ball thereby disengaging said ball from said cutting edge; and an axial cam surface on the other end of said supporting member and cooperating with said frame to move said supporting member from said normal position to said second position thereof responsive to rotation of said supporting member.

10. Apparatus for sharpening the cutting edge of an elongated blade comprising: at least one spherical ball formed of abrasive material; a supporting frame having portions adapted to receive and guide said blade for movement in a longitudinal direction; a first cup-shaped member mounted on a part of said frame; a second cup-shaped member spaced from said first cup-shaped member, said cup-shaped members being disposed on an axis inclined at an angle with respect to said direction of movement; said ball having diametrically opposite surfaces normally respectively seated in said cup-shaped members for rotation about said axis; a hollow member mounted on another part of said frame along said axis; a supporting member having said second cup-shaped member secured at one end thereof and extending through said hollow member for axial movement along said axis between a first normal position and a second position; spring means within said hollow member and urging said supporting member and said second cup-shaped member toward said ball; said spring means urging said second cup-shaped member against said ball in said normal position of said supporting member so that said first and second cup-shaped members tightly engage said ball and hold the same in engagement with one side of said cutting edge of said blade whereby said longitudinal movement of said blade causes said ball to rotate about said axis thereby sharpening said cutting edge, said supporting member in said second position biasing said cup-shaped member against said spring means away from said ball so that said cup-shaped members loosely engage said ball thereby disengaging said ball from said cutting edge; an axial cam surface on the other end of said supporting member and cooperating with said frame to move said supporting member selectively between said normal position and said second position responsive to rotation of said supporting member, said supporting member having said other end adapted to be manually rotated thereby to adjust the pressure applied by said balls on said cutting edge; a member slidably mounted on said frame and having a normal position and a second position, said last-named member being arranged in said second position thereof to engage said cam surface and to move the same away from said frame thereby to move said supporting member from said normal position to said second position thereof; and manually actuated means adapted to move said last-named member from said normal position to said second position thereof thereby to permit disengagement of said blade from said ball.

11. Apparatus for sharpening the cutting edge of an elongated blade comprising: at least one spherical ball formed of abrasive material; a supporting frame having portions adapted to receive and guide said blade for movement in a longitudinal direction; a first cup-shaped member mounted on a part of said frame; a second cup-shaped member spaced from said first cup-shaped member, said cup-shaped members being disposed on an axis lying in a plane parallel to and spaced from the plane of said blade and inclined at a substantially forty-five degree (45°) angle with respect to said direction of movement; said ball having diametrically opposite surfaces normally respectively seated in said cup-shaped members for rotation about said axis; a hollow member mounted on another part of said frame along said axis; a supporting member having said second cup-shaped member secured at one end thereof and extending through said hollow member for axial movement along said axis between a first normal position and a second position; spring means within said hollow member and urging said supporting member and said second cup-shaped member toward said ball; said spring means urging said second cup-shaped member against said ball in said normal position of said supporting member so that said first and second cup-shaped members tightly engage said ball and hold the same in engagement with one side of said cutting edge of said blade whereby said longitudinal movement of said blade causes said ball to rotate about said axis inwardly toward said cutting edge thereby sharpening said cutting edge, said supporting member in said second position biasing said cup-shaped member against said spring means away from said ball so that said cup-shaped members loosely engage said ball thereby disengaging said ball from said cutting edge, an axial cam surface on the other end of said supporting member and cooperating with said frame to move said supporting member selectively between said normal position and said second position responsive to rotation of said supporting member, said supporting member having said other end adapted to be manually rotated thereby to adjust the pressure applied by said balls on said cutting edge; a member slidably mounted on said frame and having a normal position and a second position, said last-named member being arranged in said second position thereof to engage said cam surface and to move the same away from said frame thereby to move said supporting member from said normal position to said second position thereof; and manually actuated means adapted to move said last-named member from said normal position to said second position thereof thereby to permit disengagement of said blade from said ball.

12. Apparatus for sharpening and honing the cutting edge of an elongated scalloped blade comprising: a pair of spherical balls formed of an abrasive material; a supporting frame having portions adapted to receive and guide said blade for movement in a longitudinal direction; a first pair of spaced-apart cup-shaped members and a second pair of spaced-apart cup-shaped members, said pairs of said cup-shaped members being spaced-apart in the direction of said movement an amount equal to the pitch of the teeth of said blade, said pairs of cup-shaped members being respectively disposed on an axis inclined at angles with respect to said direction of movement of said blade; said balls respectively having diametrically opposite surfaces normally seated in said cup-shaped members for rotation about said axes, one of each of said pairs of said cup-shaped members being mounted on a part of said frame; a pair of hollow members mounted on another part of said frame respectively along said axis; a pair of supporting members respectively having the other one of each pair of cup-shaped members secured at one end thereof and respectively extending through said hollow members for axial movement along said axes between first normal positions and second positions; a pair of spring means respectively within said hollow members and respectively urging said supporting members and said other cup-shaped members toward said balls; said spring means respectively urging said other cup-shaped members against said balls in said normal position of said supporting members so that said pairs of cup-shaped members respectively tightly engage the said balls and hold the same in engagement with opposite sides of said cutting edge of said blade whereby said longitudinal movement of said blade causes said balls respectively to rotate about said axes thereby sharpening and honing said cutting edge, said supporting members in said second positions thereof respectively biasing said other cup-shaped members against said spring means away from said balls so that said pairs of said cup-shaped members respectively loosely engage said balls thereby disengaging said balls from said cutting edge; and a pair of axial cam surfaces respectively formed on the other ends of said supporting members respectively cooperating with said frame to move said supporting members away from said normal positions to said second positions thereof responsive respectively to rotation of said supporting members.

13. Apparatus for sharpening the cutting edge of an elongated blade comprising: at least one spherical ball formed of abrasive material; a supporting frame having means for receiving said blade for movement in a longitudinal direction; a first cup-shaped member mounted on a part of said frame; a second member spaced from said first member, said members being disposed on an axis inclined at an angle with respect to said direction of movement; said ball having diametrically opposite surfaces normally respectively seated in said cup-shaped member and clamped between both members for rotation about said axis; and a supporting member for one of said members mounted on another part of said frame, said supporting member having a normal position with said members tightly engaging said ball and adapted to hold the same in engagement with one side of said cutting edge of said blade so that said longitudinal movement of said blade causes said ball to rotate about said axis thereby sharpening said cutting edge, said supporting member having a second position with said members loosely engaging said ball thereby disengaging said ball from said cutting edge.

14. Apparatus for sharpening the cutting edge of an elongated blade comprising: at least one spherical ball formed of abrasive material; support means for receiving said blade for movement in a longitudinal direction; and a pair of spaced-apart members respectively mounted on said support means and disposed on an axis inclined at an angle with respect to the longitudinal direction of movement of said blade, at least one of said members being cup-shaped; said ball clamped between said members and being seated in said cup-shaped member for rotation about said axis, said cup-shaped member being adapted to hold said ball in engagement with a side of said cutting edge of said blade so that said longitudinal movement of said blade causes said ball to rotate about said axis thereby sharpening said cutting edge.

15. Apparatus for sharpening and honing the cutting edge of an elongated scalloped blade comprising: a pair of spherical balls formed of abrasive material; supporting means for receiving said blade for movement in a longitudinal direction; and a pair of means on said support means respectively rotatably mounting said balls for rotation about substantially parallel axes inclined at acute angles with respect to said direction of movement of said blade, said mounting means being spaced apart in the direction of said movement respectively an amount equal to the pitch of the teeth of said blade and including members for releasably clamping and holding said balls in engagement with opposite sides of said cutting edge so that said longitudinal movement of said blades causes said balls to rotate about said axis thereby sharpening and honing said cutting edge.

16. Apparatus for sharpening and honing the cutting edge of an elongated scalloped blade comprising: a pair of spherical balls formed of abrasive material; support means for receiving said blade for movement in a longitudinal direction; and a pair of means on said support means respectively rotatably mounting said balls for rotation about axes inclined at angles with respect to said direction of movement of said blade, said mounting means being spaced apart in the direction of said movement respectively an amount equal to a multiple of the pitch of the teeth of said blade and including members for releasably clamping and holding said balls in engagement with opposite sides of said cutting edge so that said longitudinal movement of said blade causes said balls to rotate about said axis thereby sharpening and honing said cutting edge.

17. Apparatus for sharpening the cutting edge of an elongated blade comprising at least one spherical ball of abrasive material, first means for receiving said blade for movement in a longitudinal direction, and a pair of spaced-apart members respectively supported on said first means and inclined at an angle with respect to said direction of movement, at least one of said members including second means engaging circumferentially spaced portions of the surface of said ball, said ball being retained between said members for rotation, whereby said ball will be held in engagement with a side of said cutting edge of said blade.

*18. Apparatus for sharpening and honing the cutting edge of an elongated scalloped blade comprising: a pair of spherical balls formed of abrasive material; support means for receiving said blade for movement in a longitudinal direction; and a pair of means on said support means respectively releasably clamping said balls, said clamping means being spaced apart in the direction of said movement respectively an amount equal to the pitch of the teeth of said blade and being adapted respectively to hold said balls in engagement with opposite sides of said cutting edge.*

*19. Apparatus for sharpening the cutting edge of an elongated blade comprising at least one spherical ball of abrasive material, first means for receiving said blade for movement in a longitudinal direction, and a pair of spaced-apart members respectively supported on said first means and inclined at an angle with respect to said direction of moment, at least one of said members including second means engaging circumferentially spaced portions of the surface of said ball, said ball being retained between said members, whereby said ball will be held in engagement with a side of said cutting edge of said blade.*

*20. Apparatus for sharpening the cutting edge of an elongated blade comprising: at least one spherical ball formed of abrasive material; a supporting frame having portions adapted to receive and guide said blade for movement in a longitudinal direction; a first cup-shaped member mounted on a part of said frame; a second cup-shaped member spaced from said first cup-shaped member, said cup-shaped members being disposed on an axis inclined at an angle with respect to said direction of movement; said ball having diametrically opposite surfaces normally respectively seated in said cup-shaped members; a supporting member having said second cup-shaped member secured at one end thereof and mounted on another part of said frame for movement between a first normal position and a second position along said axis; and resilient means urging said second cup-shaped member toward engagement with said ball; said resilient means urging said second cup-shaped member against said ball in said normal position of said supporting member so that said cup-shaped members tightly engage said ball and hold the same in engagement with one side of said cutting edge of said blade whereby said longitudinal movement of said blade causes said ball to sharpen said cutting edge, said supporting member in said second position biasing said second cup-shaped member against said resilient means away from said ball so that said cup-shaped members loosely engage said ball thereby disengaging said ball from said cutting edge.*

References Cited in the file of this patent or the original patent

UNITED STATES PATENTS

| | | |
|---|---|---|
| 1,177,821 | Serafimides | Apr. 4, 1916 |
| 2,841,932 | Tammen et al. | July 8, 1958 |

FOREIGN PATENTS

| | | |
|---|---|---|
| 191,380 | Great Britain | Oct. 4, 1923 |